US012298858B2

(12) United States Patent
Karthik et al.

(10) Patent No.: US 12,298,858 B2
(45) Date of Patent: *May 13, 2025

(54) CONSOLIDATING SNAPSHOTS USING PARTITIONED PATCH FILES

(71) Applicant: Rubrik, Inc., Palo Alto, CA (US)

(72) Inventors: Vijay Karthik, Sunnyvale, CA (US); Abdullah Reza, Gilroy, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,603

(22) Filed: Nov. 3, 2023

(65) Prior Publication Data

US 2024/0061749 A1   Feb. 22, 2024

Related U.S. Application Data

(63) Continuation of application No. 17/536,601, filed on Nov. 29, 2021, now Pat. No. 11,886,226.

(51) Int. Cl.
*G06F 12/00* (2006.01)
*G06F 11/14* (2006.01)
*G06F 16/11* (2019.01)

(52) U.S. Cl.
CPC ........ *G06F 11/1451* (2013.01); *G06F 16/125* (2019.01); *G06F 16/128* (2019.01)

(58) Field of Classification Search
None
See application file for complete search history.

(56) References Cited

U.S. PATENT DOCUMENTS

| 9,733,862 | B1 | 8/2017 | Klemm et al. |
| 10,853,314 | B1 | 12/2020 | Shemer et al. |
| 11,886,226 | B2* | 1/2024 | Karthik ............... G06F 11/1448 |
| 2011/0119459 | A1 | 5/2011 | Satoyama et al. |
| 2012/0221527 | A1 | 8/2012 | Huang |
| 2012/0254848 | A1 | 10/2012 | Robertson et al. |
| 2014/0149698 | A1 | 5/2014 | Ezra et al. |
| 2014/0196124 | A1 | 7/2014 | Wang et al. |
| 2015/0112935 | A1 | 4/2015 | French et al. |
| 2015/0234712 | A1 | 8/2015 | Fei et al. |
| 2017/0220427 | A1 | 8/2017 | Fu et al. |
| 2018/0004656 | A1 | 1/2018 | Battaje et al. |
| 2018/0041483 | A1* | 2/2018 | Smith .................... H04L 63/08 |
| 2019/0213123 | A1 | 7/2019 | Agarwal |

(Continued)

FOREIGN PATENT DOCUMENTS

CN        104573089 A     4/2015

*Primary Examiner* — Daniel D Tsui
(74) *Attorney, Agent, or Firm* — Holland & Hart LLP

(57) ABSTRACT

A method of consolidating snapshots includes receiving a request to consolidate a first snapshot with a second snapshot into a third snapshot, the first and second snapshots stored in separate backup files, each backup file organized as a directory where data parts of the first and second snapshots can be hard linked to locations outside of the backup file, comparing the data parts of the first and second snapshots to determine if any second snapshot data part fully overlaps with any first snapshot data part, responsive to determining that a second snapshot data part fully overlaps with a first snapshot data part, hard linking the determined second snapshot data part into the third snapshot, and storing the third snapshot in the backup file.

20 Claims, 6 Drawing Sheets

(56) References Cited

U.S. PATENT DOCUMENTS

| | | |
|---|---|---|
| 2020/0019532 A1 | 1/2020 | Kashi et al. |
| 2020/0174692 A1 | 6/2020 | Dave et al. |
| 2021/0173749 A1 | 6/2021 | Ki et al. |
| 2022/0066882 A1 | 3/2022 | Wang et al. |
| 2023/0080500 A1 | 3/2023 | Karthik et al. |
| 2023/0168968 A1 | 6/2023 | Karthik et al. |
| 2023/0251934 A1 | 8/2023 | Karthik et al. |

* cited by examiner

CONSOLIDATING SNAPSHOTS USING PARTITIONED PATCH FILES

CROSS REFERENCE

The present application for patent is a Continuation of U.S. patent application Ser. No. 17/536,601 by KARTHIK et al., entitled "CONSOLIDATING SNAPSHOTS USING PARTITIONED PATCH FILES" and filed Nov. 29, 2021, which is assigned to the assignee hereof, and expressly incorporated by reference herein.

FIELD

The present disclosure relates generally to computer architecture software for a data management platform and, in some more particular aspects, to consolidating snapshots that are stored in partitioned patch files.

BACKGROUND

The volume and complexity of data that is collected, analyzed and stored is increasing rapidly over time. The computer infrastructure used to handle this data is also becoming more complex, with more processing power and more portability. As a result, data management and storage is becoming increasingly important. Significant issues of these processes include access to reliable data backup and storage, and fast data recovery in cases of failure. Other aspects include data portability across locations and platforms.

BRIEF SUMMARY

In one aspect, a method of consolidating snapshots includes receiving a request to consolidate a first snapshot with a second snapshot into a third snapshot, the first and second snapshots stored in backup files, the backup files organized as directories where data parts of the first and second snapshots may be hard linked to locations outside of the backup files, comparing the data parts of the first and second snapshots to determine if any second snapshot data part fully overlaps with any first snapshot data part, responsive to determining that a second snapshot data part fully overlaps with a first snapshot data part, hard linking the determined second snapshot data part into the third snapshot, and storing the third snapshot in one of the backup files or a third backup file.

BRIEF DESCRIPTION OF THE SEVERAL VIEWS OF THE DRAWINGS

Some embodiments are illustrated by way of example and not limitation in the views of the accompanying drawing.

DETAILED DESCRIPTION

Figure 1:
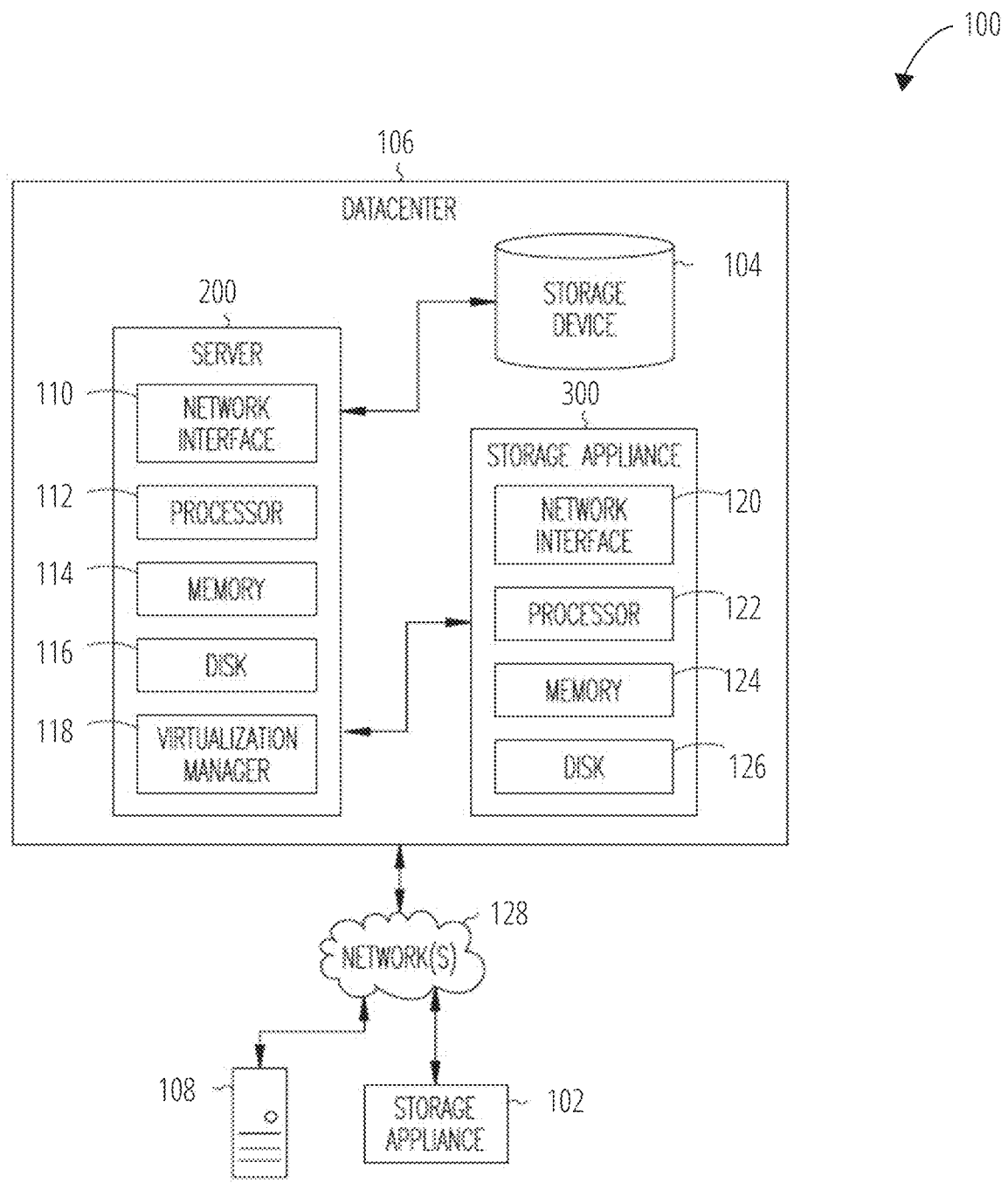
FIG. 1 depicts one embodiment of a networked computing environment in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2021, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also to NAS devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300.

Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

A user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

Figure 2:
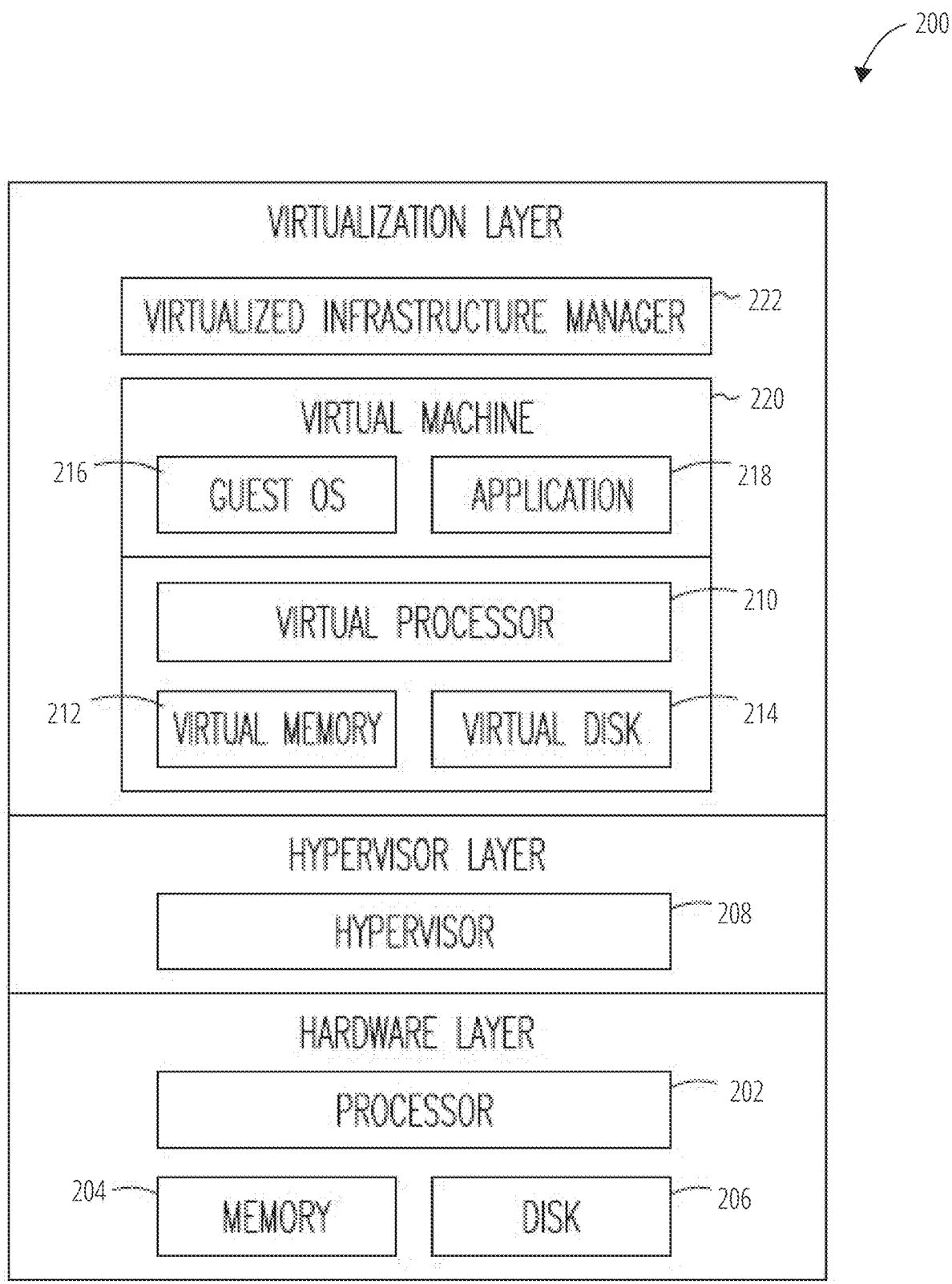
FIG. 2 depicts one embodiment of the server of FIG. 1, according to an example embodiment.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
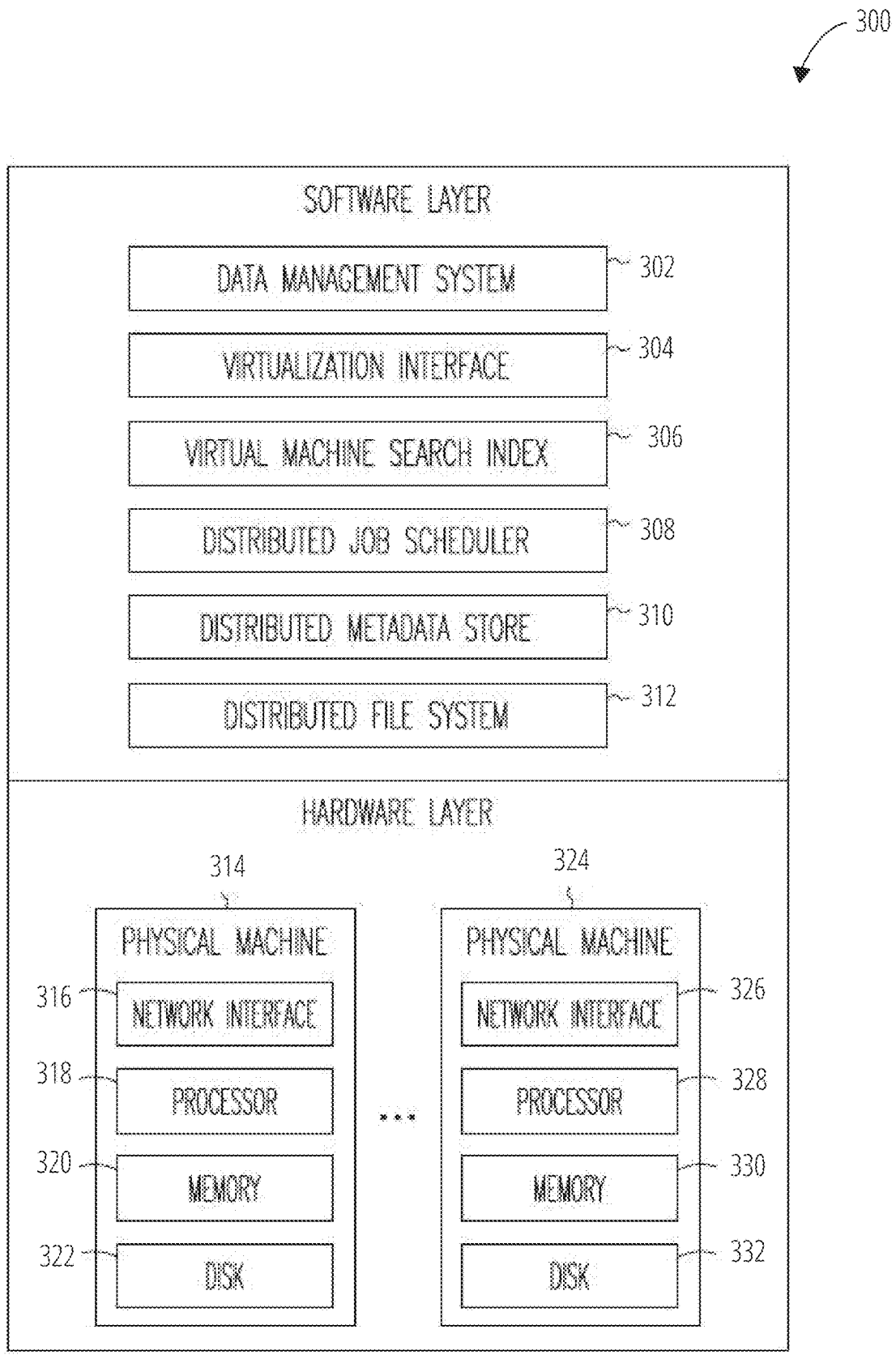
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed metadata store 310 may include a distributed database management system that provides high availability without a single point of failure. In one embodiment, the distributed metadata store 310 may comprise a database, such as a distributed document-oriented database. In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

Figure 4:
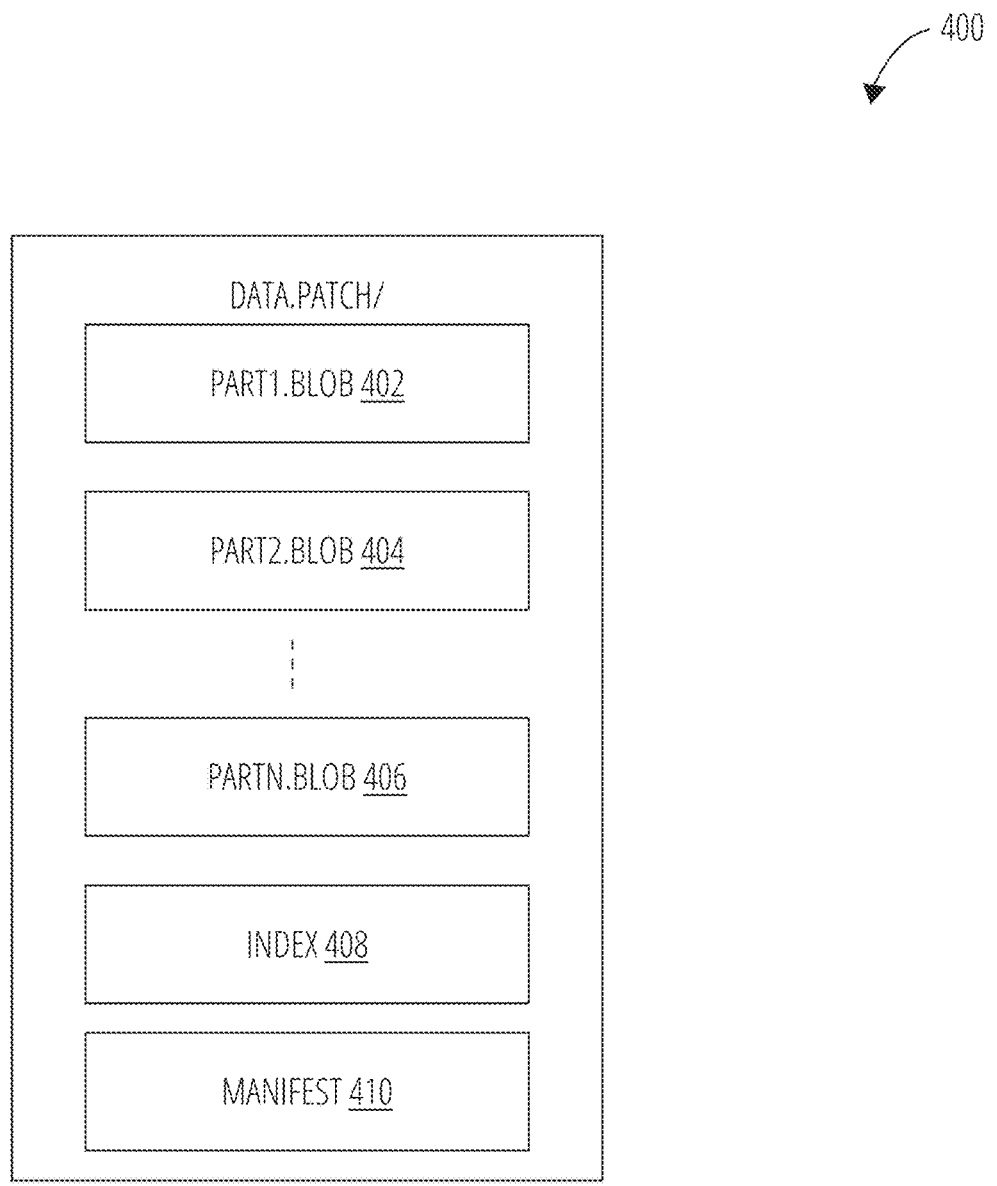
FIG. 4 illustrates a partitioned patch file in accordance with one embodiment.

FIG. 4 illustrates a partitioned patch file 400 in accordance with one embodiment. Snapshots (incrementals and fulls) are stored in the partitioned patch file 400 having a file format as shown in FIG. 4 When snapshots expire, in order to save space on a cluster, they are merged into one snapshot (also referred to as consolidated). The partitioned patch file 400 format uses N sub files including, part1.blob 402, part2.blob 404 and partN.blob 406. The partitioned patch file 400 also includes an index 408 and a manifest 410.

The partitioned patch file 400 is a directory and each individual blob in the patch file directory corresponds to a logical offset block of configurable size (e.g., 256 MB). The manifest 410 contains metadata about each blob (e.g., a list of files, final logical size of the files, etc.), and the index 408 contains index blocks and root index block for this partitioned patch file 400. The index blocks key into the sub files and the root index blocks have metadata about the index blocks (e.g., where to look for specific offsets in the sub-files). The index 408 and manifest 410 can be located at the end of the partitioned patch file 400 or interleaved throughout the partitioned patch file 400 (e.g., an index after each part).

Reads to the partitioned patch file 400 are redirected to the corresponding blob sub file based on the index. In incremental snapshots only a small portion of the logical space is overwritten compared to the whole logical space. When partitioned patch files are consolidated, the individual blob files from the source patch files can directly be hard-linked to the target patch file if the logical offsets they correspond to have not been overwritten. Hard linking is a fast metadata operation compared to the read and rewrite of data blocks.

Figure 5:
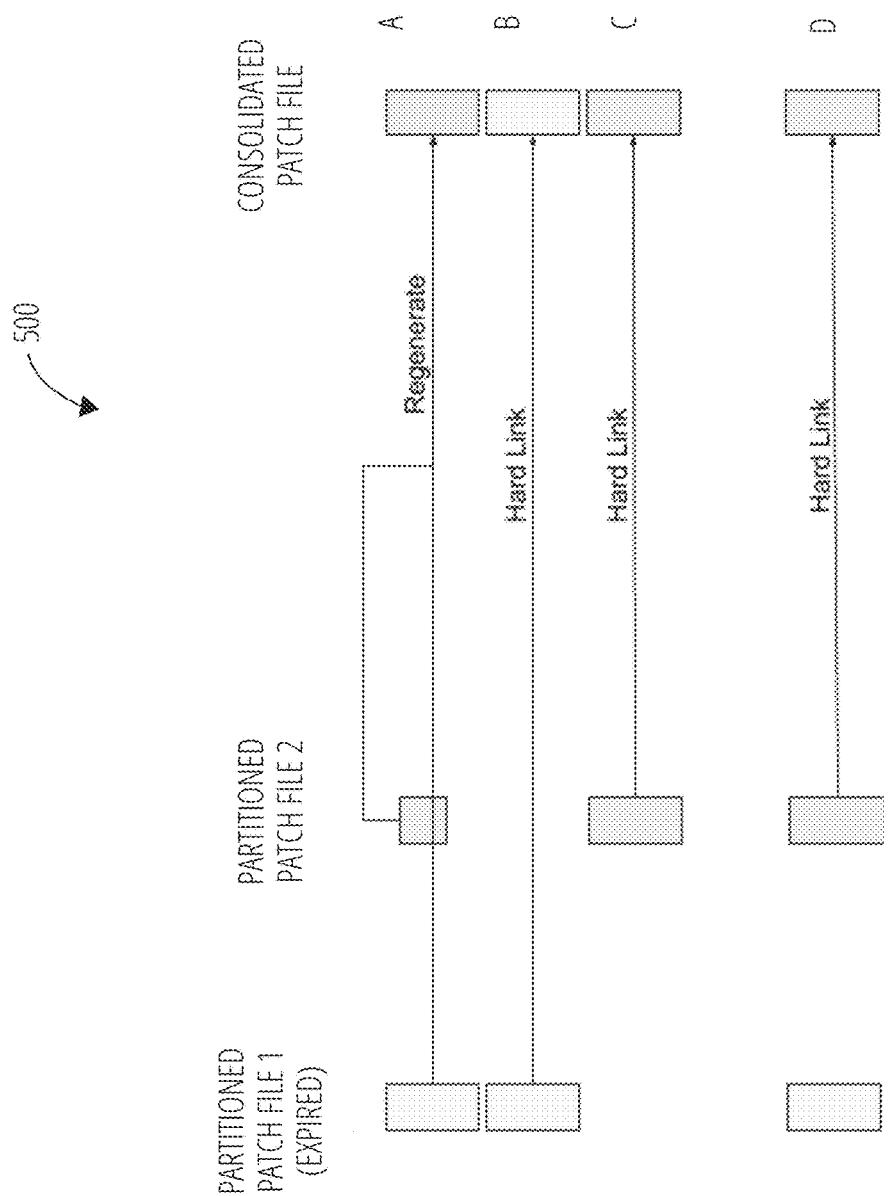
FIG. 5 illustrates consolidating snapshots in a partitioned patch file in 4 example scenarios.

FIG. 5 illustrates consolidating two partitioned patch files in 4 example scenarios A-D. The first partitioned patch file has expired (i.e., the snapshot it represents has been expired) and is to be consolidated with the second partitioned patch file to create the target (consolidated) partitioned patch file. These 2 partitioned patch files may be incremental snapshots or a base snapshot of an incremental snapshot. For the first logical offset range A, as represented by two part files from two partitioned patch files (an example of a part file being part1.blob 402), there is a logical offset overlap and, therefore, consolidation involves reading both part files and writing a consolidated part file for the target (consolidated) partitioned patch file. For the second logical offset range B, only partitioned patch file 1 has a part file and there is no overlapping part file for partitioned patch file 2. Therefore, the part file from partitioned patch file 1 can be directly hard-linked to the target (consolidated) partitioned patch file. This may include copying the hard link from Part file 1 to the consolidated partitioned patch file 400. The third logical offset range C is the direct opposite of B: here partitioned patch file 1 has no part file but partitioned patch file 2 has a part file. Therefore, the part file from partitioned patch file 2 can be directly hard-linked to the target (consolidated) partitioned patch file. For the fourth offset range D, both partitioned patch files have part files but the part file from partitioned patch file 2 completely overwrites the part file from partitioned patch file 1. Therefore, we can use the part file from partitioned patch file 2 directly and hard link it to the target (consolidated) partitioned patch file. As we can see, out of 4 offset ranges, we were able to reuse (no data read or write) existing part files in 3 cases. Only for the first case we had to perform actual data reads and writes.

Figure 6:
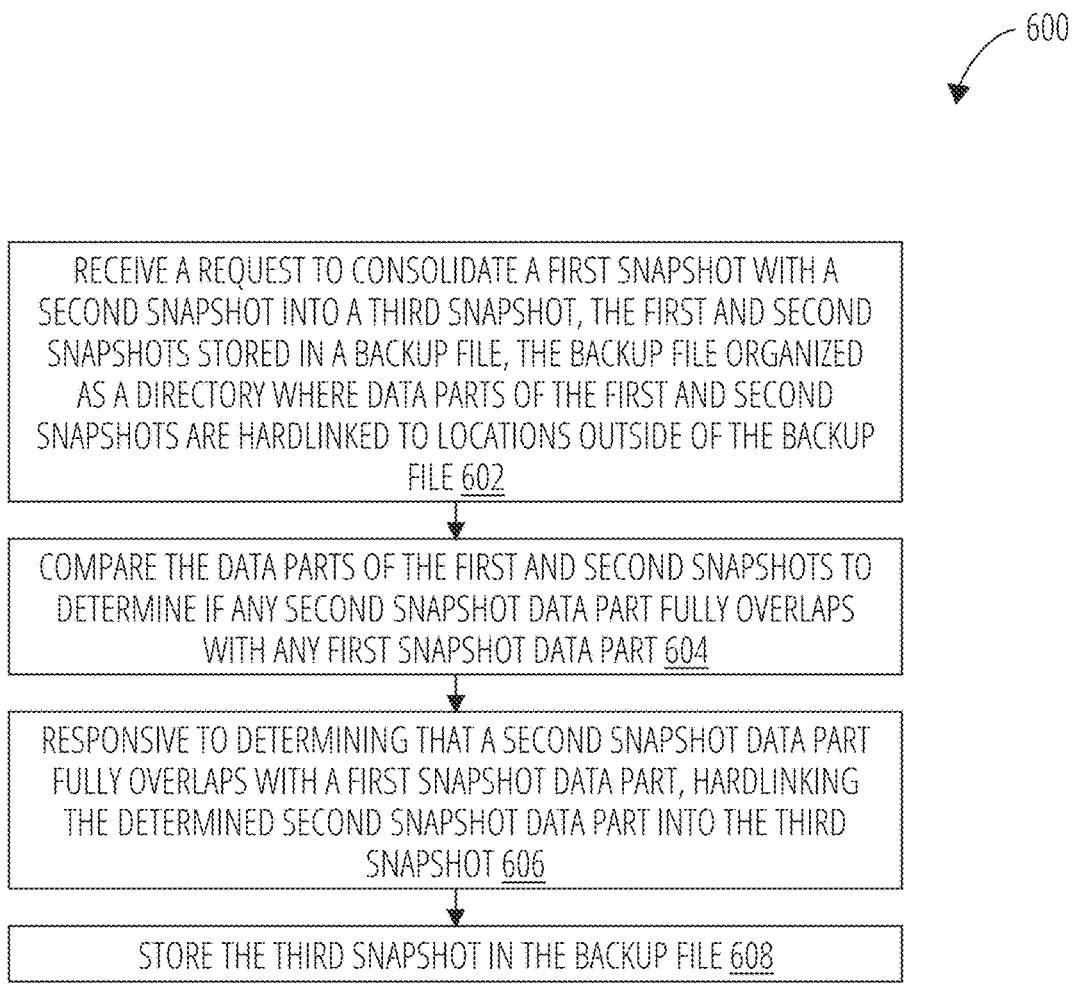
FIG. 6 illustrates a method of consolidating snapshots in a partitioned patch file in accordance with one embodiment.

FIG. 6 illustrates a method 600 of consolidating snapshots in a partitioned patch file in accordance with one embodiment. In an example embodiment, the storage appliance 300 can execute the method 600. Example methods described herein may also be implemented in the form of executable instructions stored on a machine-readable medium or in the form of electronic circuitry. For instance, the operations of the method 600 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In block 602, a computing apparatus, such as the storage appliance 300, receives a request to consolidate a first snapshot with a second snapshot into a third snapshot. The first and second snapshots are stored in two backup files, each with a format like partitioned patch file 400. Each backup file is organized as a directory where data parts can be hard linked to locations outside of the backup file. In block 604, the computing apparatus compares the data parts of the first and second snapshots to determine if any second snapshot data part fully overlaps with any first snapshot data part, e.g., by comparing logical offsets. In block 606, responsive to determining that a second snapshot data part fully overlaps with a first snapshot data part, hard linking the determined second snapshot data part into the third snapshot. In block 608, the computing apparatus then stores the third snapshot in the backup file.

The following examples describe various embodiments of methods, computer-readable media, and systems (e.g., machines, devices, or other apparatus) discussed herein.

1. A method of consolidating snapshots, comprising:
receiving a request to consolidate a first snapshot with a second snapshot into a third snapshot, the first and second snapshots stored in backup files, the backup files organized as directories where data parts of the first and second snapshots are hard linked to locations outside of the backup files;
comparing the data parts of the first and second snapshots to determine if any second snapshot data part fully overlaps with any first snapshot data part;
responsive to determining that a second snapshot data part fully overlaps with a first snapshot data part, hard linking the determined second snapshot data part into the third snapshot; and storing the third snapshot in one of the backup files or a third backup file.

2. The method of example 1, wherein the comparing compares logical offsets of the data parts of the first and second snapshots.

3. The method of any of the preceding examples, wherein the backup file includes an index indicating the logical offsets of the data parts.

4. The method of any of the preceding examples, further comprising responsive to determining that a second snapshot data part partially overlaps with the first snapshot data part, consolidating the first and second data parts via regenerating a third snapshot data part based on the first and second snapshot data parts.

5. The method of any of the preceding examples, wherein the backup file is a directory and the parts correspond to a logical offset block of configurable size.

6. The method of any of the preceding examples, wherein the backup file includes a manifest that lists all files in the backup file and their logical size.

7. The method of any of the preceding examples, further comprising responsive to determining that for a first snapshot data part there is no corresponding second snapshot data part, hard linking the first snapshot data part into the third snapshot and storing the third snapshot in the backup file.

8. The method of any of the preceding examples, further comprising responsive to determining that for a second snapshot data part there is no corresponding first snapshot data part, hard linking the second snapshot data part into the third snapshot and storing the third snapshot in the backup file.

9. The method of any of the preceding examples, wherein the first and second snapshots are incremental snapshots.

10. A non-transitory computer-readable storage medium, the computer-readable storage medium including instructions that when executed by a computer, cause the computer to:
receive a request to consolidate a first snapshot with a second snapshot into a third snapshot, the first and second snapshots stored in backup files, the backup files organized as directories where data parts of the first and second snapshots are hard linked to locations outside of the backup files;
compare the data parts of the first and second snapshots to determine if any second snapshot data part fully overlaps with any first snapshot data part;
responsive to determining that a second snapshot data part fully overlaps with a first snapshot data part, hard link the determined second snapshot data part into the third snapshot; and store the third snapshot in any of the backup files or a third backup file.

11. A computing apparatus comprising:
a processor; and
a memory storing instructions that, when executed by the processor, configure the apparatus to: receive a request to consolidate a first snapshot with a second snapshot into a third snapshot, the first and second snapshots stored in backup files, the backup files organized as directories where data parts of the first and second snapshots are hard linked to locations outside of the backup files;
compare the data parts of the first and second snapshots to determine if any second snapshot data part fully overlaps with any first snapshot data part;
responsive to determining that a second snapshot data part fully overlaps with a first snapshot data part, hard link the determined second snapshot data part into the third snapshot; and store the third snapshot in any of the backup files or a third backup file.

12. The computing apparatus of example 11, wherein the comparing compares logical offsets of the data parts of the first and second snapshots.

13. The computing apparatus of any of the preceding examples, wherein the backup file includes an index indicating the logical offsets of the data parts.

14. The computing apparatus of any of the preceding examples, further comprising responsive to determining that a second snapshot data part partially overlaps with the first snapshot data part, consolidating the first and second data parts via regenerating a third snapshot data part based on the first and second snapshot data parts.

15. The computing apparatus of any of the preceding examples, wherein the backup file is a directory and the parts correspond to a logical offset block of configurable size.

16. The computing apparatus of any of the preceding examples, wherein the backup file includes a manifest that lists all files in the backup file and their logical size.

17. The computing apparatus of any of the preceding examples, further comprising responsive to determining that for a first snapshot data part there is no corresponding second snapshot data part, hard linking the first snapshot data part into the third snapshot and storing the third snapshot in the backup file.

18. The computing apparatus of any of the preceding examples, further comprising responsive to determining that for a second snapshot data part there is no corresponding first snapshot data part, hard linking the second snapshot data part into the third snapshot and storing the third snapshot in the backup file.

19. The computing apparatus of any of the preceding examples, wherein the first and second snapshots are incremental snapshots.

20. The computing apparatus of any of the preceding examples, wherein the first snapshot is a base snapshot and the second snapshot in an incremental snapshot.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
   comparing, as part of a consolidation procedure for consolidating a first snapshot and a second snapshot into a third snapshot, a first set of data parts of the first snapshot and a second set of data parts of the second snapshot, wherein the first set of data parts are hard linked to locations outside of the first snapshot and the second set of data parts are hard linked to locations outside of the second snapshot;
   responsive to determining, based at least in part on the comparing, that a first data part of the first set of data parts fully overlaps with a second data part of the second set of data parts, hard linking the second data part into the third snapshot; and
   storing the third snapshot in a backup file.

2. The method of claim 1, wherein the comparing comprises:
   comparing respective first logical offsets of the first set of data parts with respective second logical offsets of the second set of data parts.

3. The method of claim 2, wherein the first snapshot is stored in a second backup file that includes a first index indicating the respective first logical offsets, and wherein the second snapshot is stored in a third backup file that includes a second index indicating the respective second logical offsets.

4. The method of claim 3, wherein the second backup file includes a first manifest that lists files in the second backup file and respective logical sizes of the files in the second backup file, and wherein the third backup file includes a second manifest that lists files in the third backup file and logical sizes of the files in the third backup file.

5. The method of claim 2, wherein the first set of data parts correspond to respective first logical offset blocks having a first configurable size and the second set of data parts correspond to respective second logical offset blocks having a second configurable size.

6. The method of claim 1, further comprising:
   responsive to determining that an additional data part of the second set of data parts partially overlaps with an additional data part of the first set of data parts, consolidating the additional data part of the second set of data parts and the additional data part of the first set of data parts based at least in part on regenerating a third data part into the third snapshot, wherein regenerating the third data part is based at least in part on the additional data part of the second set of data parts and the additional data part of the first set of data parts.

7. The method of claim 1, further comprising:
   responsive to determining that for an additional data part of the first set of data parts there is no corresponding additional data part of the second set of data parts, hard linking the additional data part of the first set of data parts into the third snapshot.

8. The method of claim 1, further comprising:
   responsive to determining that for an additional data part of the second set of data parts there is no corresponding additional data part of the first set of data parts, hard linking the additional data part of the second set of data parts into the third snapshot.

9. The method of claim 1, further comprising:
   receiving a request to consolidate the first snapshot with the second snapshot, wherein the comparing is responsive to the request.

10. The method of claim 9, wherein the request is received from a storage application associated with a data center at which the first snapshot and the second snapshot are stored.

11. The method of claim 9, wherein the first snapshot and the second snapshot are incremental snapshots.

12. A non-transitory computer-readable storage medium, the non-transitory computer-readable storage medium including instructions that when executed by a computer, cause the computer to:

compare, as part of a consolidation procedure for consolidating a first snapshot and a second snapshot into a third snapshot, a first set of data parts of the first snapshot and a second set of data parts of the second snapshot, wherein the first set of data parts are hard linked to locations outside of the first snapshot and the second set of data parts are hard linked to locations outside of the second snapshot;

responsive to a determination, based at least in part on comparison of the first set of data parts of the first snapshot and the second set of data parts of the second snapshot, that a first data part of the first set of data parts fully overlaps with a second data part of the second set of data parts, hard link the second data part into the third snapshot; and store the third snapshot in a backup file.

13. A computing apparatus comprising:

at least one processor; and at least one memory storing instructions that, when executed by the at least one processor, configure the computing apparatus to:

compare, as part of a consolidation procedure for consolidating a first snapshot and a second snapshot into a third snapshot, a first set of data parts of the first snapshot and a second set of data parts of the second snapshot, wherein the first set of data parts are hard linked to locations outside of the first snapshot and the second set of data parts are hard linked to locations outside of the second snapshot;

responsive to a determination, based at least in part on comparison of the first set of data parts of the first snapshot and the second set of data parts of the second snapshot, that a first data part of the first set of data parts fully overlaps with a second data part of the second set of data parts, hard link the second data part into the third snapshot; and store the third snapshot in a backup file.

14. The computing apparatus of claim 13, wherein the instructions to compare, when executed by the at least one processor, configure the computing apparatus to:

compare respective first logical offsets of the first set of data parts with respective second logical offsets of the second set of data parts.

15. The computing apparatus of claim 14, wherein the first snapshot is stored in a second backup file that includes a first index indicating the respective first logical offsets, and wherein the second snapshot is stored in a third backup file that includes a second index indicating the respective second logical offsets.

16. The computing apparatus of claim 15, the second backup file includes a first manifest that lists files in the second backup file and respective logical sizes of the files in the second backup file, and wherein the third backup file includes a second manifest that lists files in the third backup file and logical sizes of the files in the third backup file.

17. The computing apparatus of claim 14, wherein the first set of data parts correspond to respective first logical offset blocks having a first configurable size and the second set of data parts correspond to respective second logical offset blocks having a second configurable size.

18. The computing apparatus of claim 13, wherein the instructions, when executed by the at least one processor, further configure the computing apparatus to:

responsive to a determination that an additional data part of the second set of data parts partially overlaps with an additional data part of the first set of data parts, consolidate the additional data part of the second set of data parts and the additional data part of the first set of data parts based at least in part on a regeneration of a third data part into the third snapshot, wherein the regeneration of the third data part is based at least in part on the additional data part of the second set of data parts and the additional data part of the first set of data parts.

19. The computing apparatus of claim 13, wherein the instructions, when executed by the at least one processor, further configure the computing apparatus to:

responsive to a determination that for an additional data part of the first set of data parts there is no corresponding additional data part of the second set of data parts, hard link the additional data part of the first set of data parts into the third snapshot.

20. The computing apparatus of claim 13, wherein the instructions, when executed by the at least one processor, further configure the computing apparatus to:

responsive to a determination that for an additional data part of the second set of data parts there is no corresponding additional data part of the first set of data parts, hard link the additional data part of the second set of data parts into the third snapshot.

* * * * *